L. D. LOVEKIN.
THERMOSTATIC VALVE MECHANISM.
APPLICATION FILED JUNE 1, 1911.
1,170,834.
Patented Feb. 8, 1916.
4 SHEETS—SHEET 1.
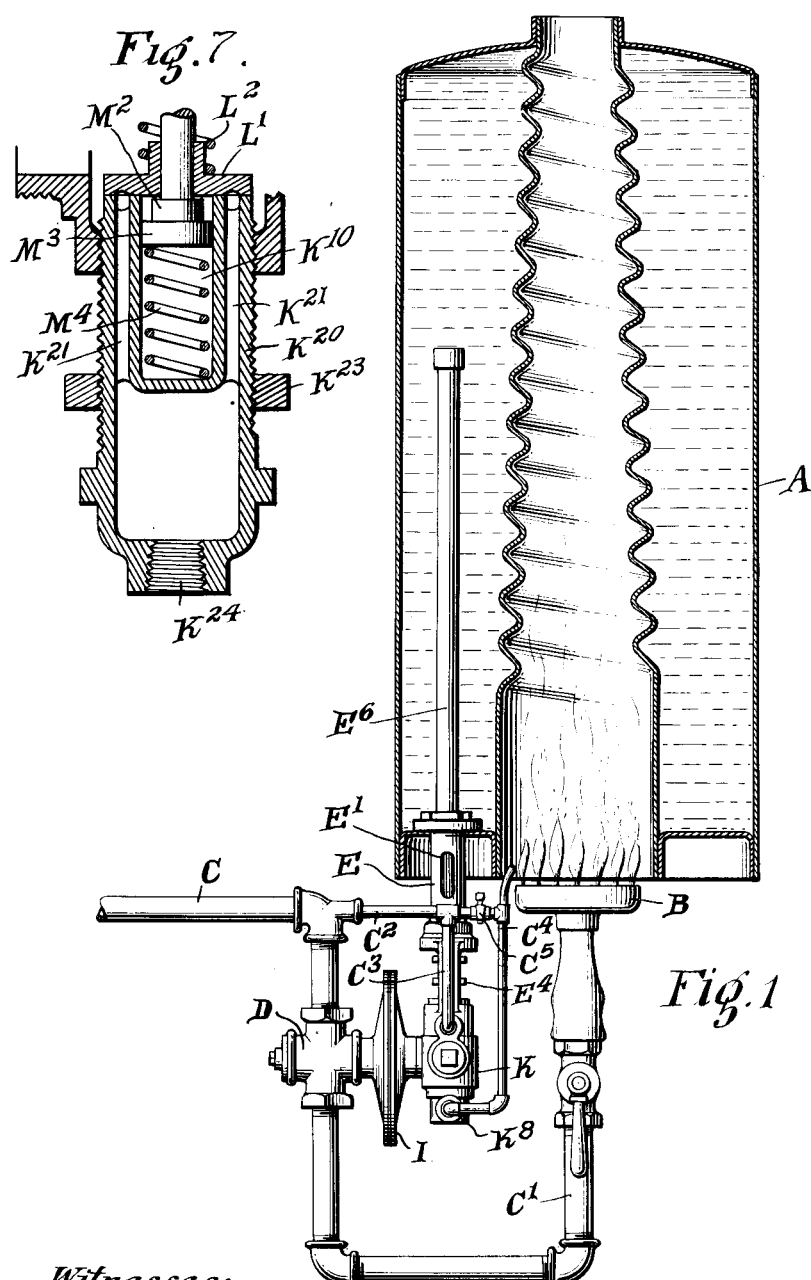

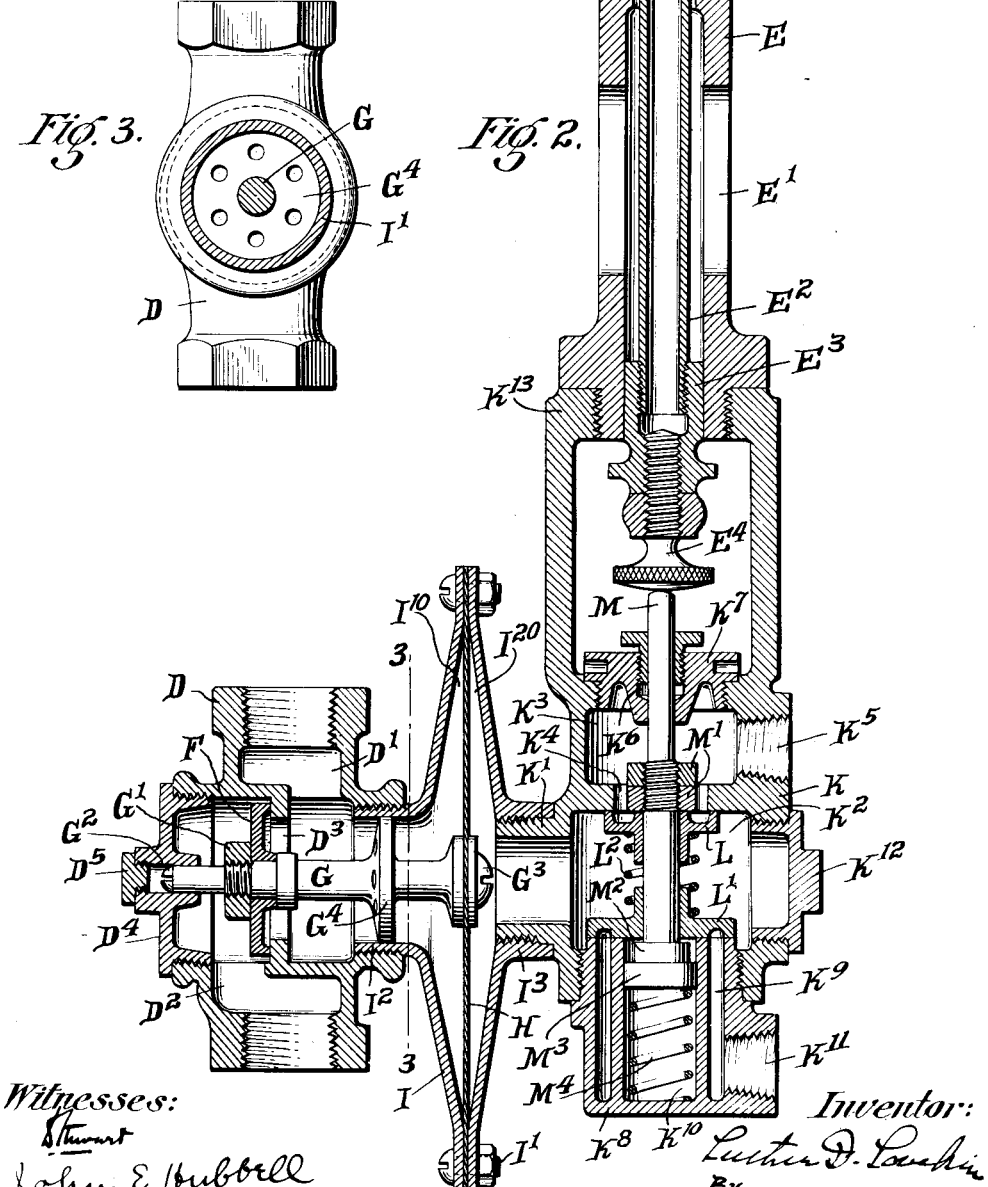

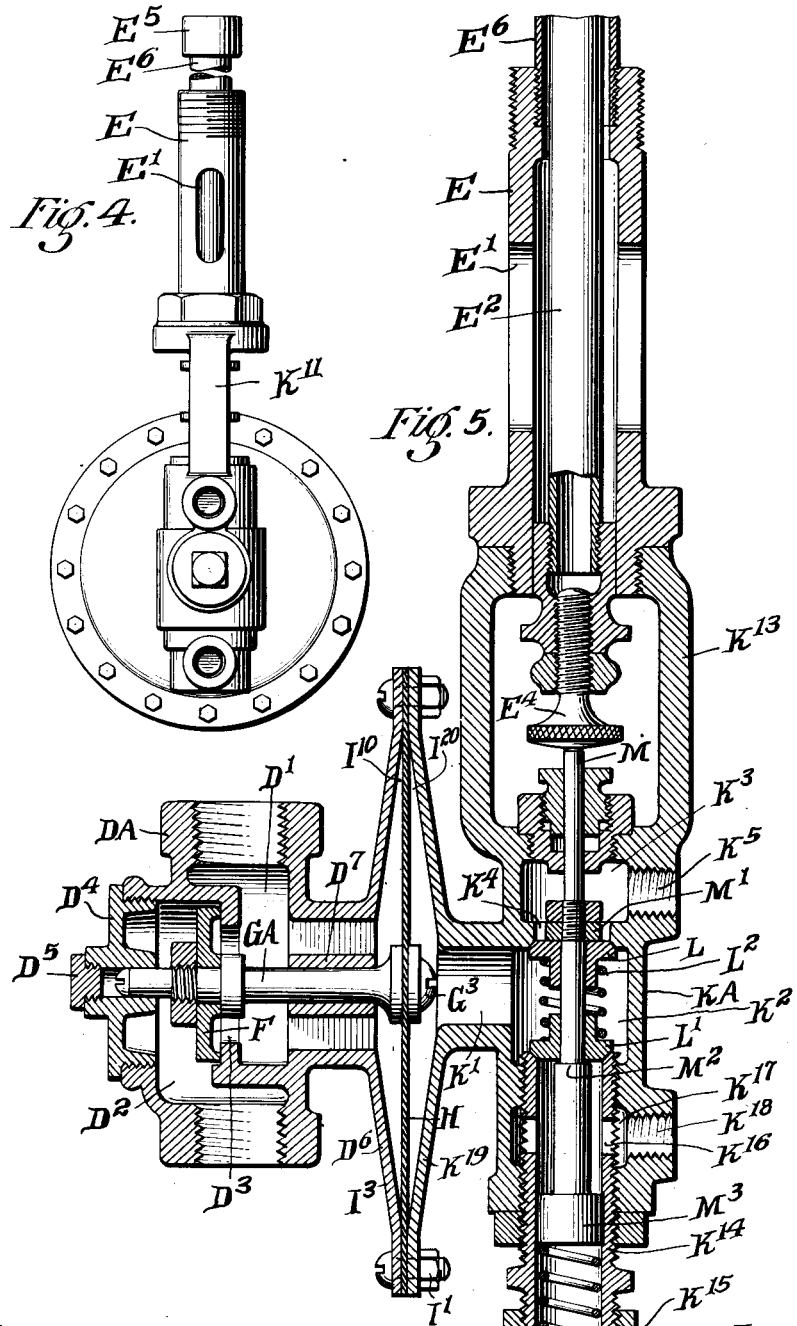

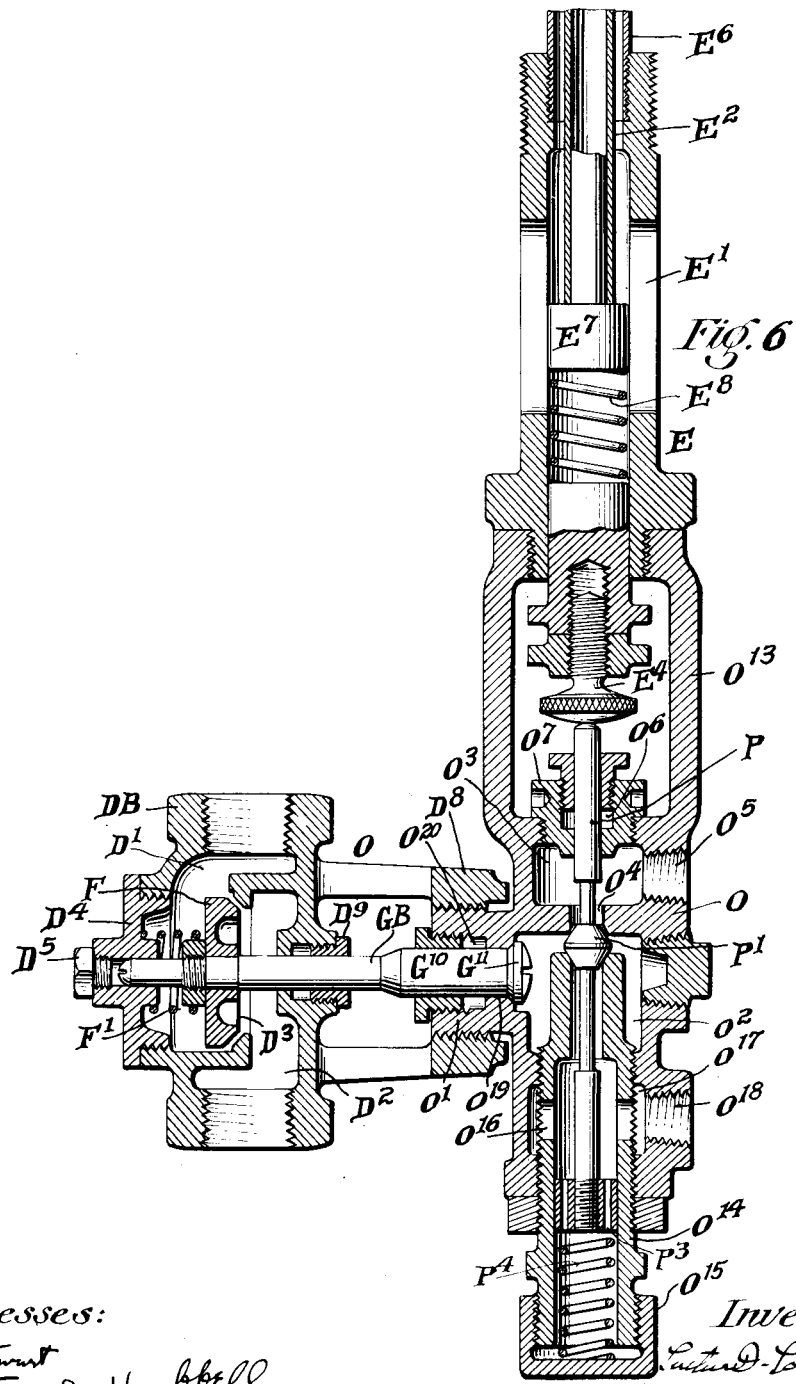

UNITED STATES PATENT OFFICE.

LUTHER D. LOVEKIN, OF PHILADELPHIA, PENNSYLVANIA.

THERMOSTATIC VALVE MECHANISM.

1,170,834.   Specification of Letters Patent.   Patented Feb. 8, 1916.

Application filed June 1, 1911. Serial No. 630,611.

*To all whom it may concern:*

Be it known that I, LUTHER D. LOVEKIN, a citizen of the United States of America, residing in the city of Philadelphia, in the county of Philadelphia, and in the State of Pennsylvania, have invented a certain new and useful Improvement in Thermostatic Valve Mechanism, of which the following is a true and exact description, reference being had to the accompanying drawings, which form a part thereof.

My present invention relates to a thermostatic valve mechanism and particularly to mechanism of this character adapted to automatically control and regulate the flow of gas to the burner of a water heater to maintain the temperature of the water heater at or above a certain predetermined minimum.

The general object of the invention is to provide a simple, effective and reliable mechanism for the purpose specified.

More specifically the object of the invention is to provide thermostatic mechanism for operating a main gas valve which will insure positive and substantial opening and closing movements of said valve. This I accomplish by the use of a pilot valve directly controlled by the thermostatic mechanism and fluid pressure operating means for the main valve controlled in turn by the pilot valve. The pressure fluid admitted to the actuating mechanism of the main valve by the pilot valve may be water or other fluid under pressure, but, in a preferred form of my invention, I utilize gas from the gas system supplying the gas burned as the pressure fluid for operating the main valve, and my invention comprises means for suitably disposing of and utilizing the gas exhausted from the fluid pressure valve operating means from time to time.

A further specific object of the invention is to so provide mechanism of the character specified which is simple in construction and comparatively cheap to manufacture as to simplify and reduce its cost of manufacture, and at the same time is easy to assemble, take apart and adjust.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described forms in which the invention may be embodied.

Of the drawings, Figure 1 is an elevation, partly in section, showing a water heater and mechanism for controlling the flow of fuel burned to heat the water. Fig. 2 is a sectional elevation of the fuel controlling mechanism proper shown in Fig. 1. Fig. 3 is a sectional elevation taken on the line 3—3 of Fig. 2. Fig. 4 is an elevation taken at right angles to Fig. 2 but on a smaller scale. Fig. 5 is a view taken similarly to Fig. 2 showing a modified construction. Fig. 6 is a view taken similarly to Fig. 2 but showing a second modified construction. Fig. 7 is a partial sectional elevation of another modified construction.

In the drawings, and referring first to the construction shown in Figs. 1 to 4 inclusive, A represents a water heater, B a main gas burner for the heater A, C a gas supply pipe, C' a pipe connected at one end to the burner B and at the other end to the main gas valve D which is connected in turn to the supply pipe C. The valve D is controlled, as hereinafter explained in detail, by a thermostatic mechanism E secured to the bottom of the heater and comprising a portion extending into the water in the heater and a pilot valve K operated by the thermostatic mechanism.

The casing of the main gas valve D is formed with an inlet chamber D' and an outlet chamber $D^2$, which are connected to the pipes C and C', respectively, and with a port $D^3$ connecting the chambers D' and $D^2$. The port $D^3$ is controlled by a valve member F located on the outlet side of port $D^3$ and secured on a valve stem G, as by clamping it between a collar formed on the latter and a nut G'. The valve stem G has a bearing at its outer end in a guide passage formed in the cap $D^4$ which removably closes an opening in the valve casing through which the valve member F may be removed and inserted. The valve stem G is formed at its outer end with a kerf $G^2$, by means of which the valve stem may be held against rotation in adjusting the apparatus. The passage in which the outer end of the valve stem G works is normally closed by the plug $D^5$.

At its inner end the valve stem G is secured as by means of the screws $G^3$, to the center of a flexible diaphragh H which is preferably formed of oiled leather. The diaphragm H, which is of circular form, is located in the pressure chamber I, being clamped at its periphery between the edges of the two conical members which are secured together by bolts I' and unite to form the pressure chamber I. The diaphragm H divides the pressure chamber into two compartments $I^{10}$ and $I^{20}$, the compartment $I^{10}$ being open to the inlet valve chamber D'. The conical member forming the portion of the chamber I, adjacent the valve casing D is formed with a central exteriorly threaded neck $I^2$ which is screwed into an aperture formed in the wall of the valve casing D and is coaxial with the port $D^3$. The valve stem G is formed with a perforated collar $G^4$ which has a sliding bearing on the neck $I^2$ and with the bearing for the outer end of the valve stem G maintains valve stem G and valve F in accurate alinement.

The conical member forming the side of the pressure chamber I, remote from the valve casing D is formed with a central internally threaded neck $I^2$ which is screwed onto the exteriorly threaded hollow boss K' of the pilot valve casing K and the compartment $I^{20}$ of the chamber I is in communication with an intermediate chamber $K^2$ of the valve casing K through the hollow neck K'. The valve casing K has an inlet chamber $K^3$ communicating with the intermediate chamber $K^2$ through the port $K^4$. The pilot valve mechanism is also provided with an outlet passage or chamber $K^9$ leading away from the intermediate chamber $K^2$. In the construction shown in Fig. 2, the outlet passage $K^9$ is in the form of a channel, circular in cross section, formed in a separate valve casing part $K^8$ screwed into a threaded aperture formed in the wall of the chamber $K^2$.

Communication between the supply chamber $K^3$ and the intermediate chamber $K^2$ and between the latter and the outlet chamber $K^9$ of the pilot valve mechanism is controlled by valve members L and L', respectively. These are located within the chamber $K^2$ and are slidingly mounted on the valve stem M between the shoulder $M^2$ and the adjustable nut M'. The valves L and L' are at all times urged away from each other and into the position in which they close the port $K^4$ and the mouth of the channel $K^9$ by a spring $L^2$. It will be apparent, however, that when the valve stem is depressed the nut M' will engage the valve L and move it away from its seat and that in this condition of the apparatus the valve L' will be seated. Similarly, when the valve stem M is elevated, the shoulder $M^2$ will engage the valve L' and lift it away from its seat and at the same time the valve L will be against its seat and held in place by the spring $L^2$. In practice, I prefer that the parts shall be so proportioned, as shown in Fig. 2, that the valves L and L' may both be seated at the same time, and a slight movement of the valve stem M away from a neutral position is required to open either valve.

The valve stem M is moved to open the valve L' by the spring $M^4$ working in the spring chamber $K^{10}$ in the casing part $K^8$ within the channel $K^9$. The spring $M^4$ which should be under tension sufficient to overcome the tension of the spring $L^2$, when occasion permits, bears against a piston-like enlargement $M^3$ of the lower end of the valve stem M. This piston enlargement $M^3$ works in the spring chamber $K^{10}$ formed in casing part $K^8$ and serves as a guide for the lower end of the valve stem M. By preference, to minimize the escape of gas through the channel $K^9$ I form the valve member L' so that it seats on the end of the cylindrical portion of the member $K^8$ which separates the spring chamber $K^{10}$ from the channel $K^9$ as well as against the portion of the end of the casing part $K^8$ which surrounds the upper end of the channel $K^9$. This prevents gas from passing into the passage $K^9$ from spring chamber $K^{10}$ when the valve L' is seated and makes it unnecessary to restrict leakage into chamber $K^{10}$ from chamber $K^2$. To facilitate an inspection of the interior of the chamber $K^2$ and the adjustment of the connection between the valve stem G and the diaphragm H, I preferably form an aperture in the wall of the member $K^2$ closed by the removable threaded plug $K^{12}$. As shown, the valve steam M passes through a stuffing box $K^6$ formed in the plug $K^7$ threaded into an aperture formed in the upper wall of the chamber $K^3$.

The casing K of the pilot valve mechanism is formed with a yoke $K^{13}$ into which is threaded the body member of the thermostatic valve mechanism E. This body member is threaded at its upper end into the lower end wall of the heater and has threaded into its upper end a tubular member $E^6$ which extends into the interior of the heater and is closed at its inner end by the cap member $E^5$. The valve actuating member proper of the thermostatic mechanism is a tubular member $E^2$ provided at its lower end with an end member $E^3$ guided in the lower end of the central passage formed in the body member of the thermostatic mechanism and having adjustably secured to it a part $E^4$ engaging the upper end of the valve stem M. At its upper end the tubular member $E^2$ is provided with an end member $E^{40}$ of suitable shape which abuts against the cap member $E^5$. Passages E' are formed in the body member through which a circulation of air is effected through the space surrounding the member $E^2$. The air circulation thus provided tends to keep down the temperature of the member $E^2$ and thereby contributes to the sensitiveness of the thermostatic actuating mechanism. The tubular members $E^2$ and $E^6$ are of materials having different coefficients of expansion, for instance, the tube $E^2$ may preferably be of steel, having a relatively low coefficient of thermal expansion, while the tube $E^6$, of brass or copper, or other material, having a relatively high coefficient of thermal expansion.

In the arrangement shown in Fig. 1, gas is supplied to the chamber $K^3$ of the pilot valve mechanism through the pipe $C^2$ directly connected to the supply pipe C, and the branch pipe $C^3$ which is screwed into the threaded aperture $K^5$ leading to the chamber $K^8$. The waste gas from the pilot valve mechanism is carried away by the pipe $C^4$ screwed into the threaded aperture $K^{11}$ of the casing part $K^8$. Advantageously, as shown, the pipe $C^4$ terminates at its free end in proximity to the burner B, and in practice I prefer that the upper end of the pipe $C^4$ shall serve as the pilot burner by which a pilot flame for igniting the gas issuing from the main burner is constantly kept alive. For this purpose I may connect the pipe $C^4$ to the pipe $C^2$ through a suitable regulating valve $C^5$, as shown in Fig. 1, which permits of a constant restricted flow of gas to the burner end of the pipe $C^4$. It will be understood that the arrangement should be such that the restricted flow of gas into the pipe C permitted by the valve $C^5$ is not great enough to create a pressure in the pipe $C^4$ appreciably higher than the pressure of the atmosphere.

In operation the expansion of the tube $E^6$ relative to the tube $E^2$ occurring when the water in the heater is hot enough permits the pilot valve stem M to be moved by the spring $M^4$ into the position in which the valve L closes the port $K^4$ while the valve L' is held off its seat so that the pressure in chamber $K^2$ and compartment $I^{20}$ becomes practically equal to the pressure of the atmosphere. The valve F is then held closed by the pressure of the gas supply system. This pressure, while acting directly against the valve F in a direction to open the latter, acts in the opposite direction against the substantially larger area of the left hand side of the diaphragm H, as seen in Fig. 2. When, thereafter, the temperature of the water in the tank A falls to a predetermined minimum, the consequent contraction of the member $E^6$ causes the valve stem M to be moved to permit valve L' to close and to open valve L. This permits gas from the supply system to flow from the chamber $K^3$ of the pilot valve mechanism to the chamber $K^2$ and compartment $I^{20}$ of the pressure chamber. This equalizes the pressure on the opposite sides of the diaphragm H and the gas pressure acting directly against the inlet side of the valve F causes the latter to begin to open. As the valve F begins to open the pressure on the outlet side of the valve rises and the pressure on the inlet side falls. This diminishes the pressure differential acting directly on the valve F but is more than compensated for, and a rapid and complete opening of the valve is insured by the consequent decrease in the pressure acting against the left hand side of the diaphragm H. Gas is then supplied to the burner B through the pipe C. The gas issuing from the burner B is instantly ignited by the flame from the pilot burner and the flame from the main burner continues until the water in the tank is raised to the desired temperature, whereupon, the resultant expansion of the thermostatic member $E^6$ first permits the valve stem M to be moved by the spring $M^4$ into the position shown in Fig. 2, in which valves L and L' are both seated and then as the member $E^6$ continues to expand, into the position in which the valve L' is lifted from its seat, thus permitting the gas in the chamber $K^2$ and compartment $I^{20}$ of the pressure chamber to exhaust. This reduces the pressure in the compartment $I^{20}$ to an approximate equality with the atmospheric pressure. When this occurs the pressure of the gas supply system maintained in the compartment $I^{10}$ and acting against the diaphragm H causes the valve F to close. The gas exhausting from the compartment $I^{20}$ to the pressure chamber and valve chamber $K^2$ is preferably burned in the pilot burner flame, as already described. The quantity of gas thus discharged through the pipe $C^4$ each time the valve F is closed is very small, and by passing it to the pilot burner, it is disposed of in an entirely safe and unobjectionable manner. Moreover, with this method of disposing of the gas passing through the pilot valve mechanism, any leakage through that mechanism is disposed of with entire safety.

The modified apparatus shown in Fig. 5 is intended for operation in the same manner as the apparatus of Fig. 2 with gas as the pressure fluid controlled by the thermostatic pilot valve mechanism. The main gas valve DA of Fig. 5 is shown as identical with the valve D and the pressure chamber IA is generally similar to the pressure chamber I, but differs from the latter in that it is formed in part by a conical extension $D^6$ of the main valve casing, and in part by an extension $K^{15}$ of the pilot valve casing KA. The valve casing DA is formed with a spider $D^7$ in which is a passage slidingly receiving the valve stem GA which is thereby alined and guided. This makes the perforated piston collar $G^5$ of Fig. 2 unnecessary. The pilot valve mechanism of Fig. 5 differs from that of Fig. 2 in that the casing part $K^8$ of Fig. 2 is replaced by a tubular member $K^{14}$, closed at its lower end by a removable cap $K^{15}$ and provided with ports $K^{16}$ connecting its interior with a channel $K^{17}$ formed in the pilot valve casing KA below the chamber $K^2$ and from which leads the threaded port $K^{18}$, which may receive the pipe $C^4$ when the apparatus is used as shown in Fig. 1. The valve $L^1$ seats directly on the upper end of the tube $K^{14}$.

Aside from the differences noted, the mechanism shown in Fig. 5 may be identical with that of Fig. 2 and with the exception of parts already referred to, the corresponding parts in the two figures are designated by the same symbols. The operation of the apparatus shown in Fig. 5 will be understood without additional explanation. The construction of the casing part $K^{14}$ and co-operating parts of the pilot valve mechanism obviously contribute to the mechanical excellence of the apparatus and the ease with which it can be assembled and disassembled for inspection, cleaning and repairs.

The apparatus shown in Fig. 6 is in many respects similar to that already described, but is particularly adapted for use where the motive fluid controlled by the pilot valve mechanism is water or other fluid under a pressure appreciably higher than the pressure of the gas controlled by the pilot valve mechanism of Figs. 2 and 5. In Fig. 6, the main gas valve DB is practically identical with the gas valves D and A heretofore described, and comprises parts $D'$ to $D^5$ inclusive, similar to those already described. The valve member F in this construction is carried by a valve stem GB which passes through an aperture formed in the wall of the outlet chamber $D^2$ of the valve casing, leakage being prevented by a stuffing box $D^9$. In this form of the apparatus, however, the valve F is located on the inlet side of the port $D^3$ and a spring $F'$ is provided which acts on the valve in a direction tending to seat it. The casing of the main valve DB is formed with bracket arms supporting an internally threaded ring $D^8$ which is screwed on the boss $O'$ of the pilot valve mechanism O, which is generally similar to the pilot valve mechanism KA of Fig. 5 and comprises parts $O^2$ to $O^7$ and $O^{13}$ to $O^{18}$, substantially identical respectively with the parts $K^2$ to $K^7$ and $K^{13}$ to $K^{18}$ inclusive, of Fig. 5. The valve stem GB is provided with a portion $G^{10}$ which extends through an aperture $O^{19}$ formed in the wall of the chamber $O^2$ and carries at its inner end an enlargement $G^{11}$ forming a valve adapted to seat against the conical seat provided at the margin of the inner end of the aperture $O^{19}$. The enlargement $G^{11}$ engages this seat when the valve F is open. Additional means to prevent leakage from the compartment $O^2$ along the valve stem portion $G^{10}$ is formed by the stuffing box $O^{20}$. The admission to, and exhaust from the chamber $O^2$ is controlled by a valve member $P'$ carried by the stem P and serving to alternately close the port $O^4$ and to close the upper end of member $O^{14}$, accordingly as the stem $P'$ is moved in one direction by the spring $P^4$ acting against the piston $P^3$ working in the member $O^{14}$ or is depressed by the thermostatic mechanism E, which may be substantially identical with that already described, except that between the member $E^4$ and a member $E^7$ secured to the lower end of the tube $E^2$ there is interposed a yielding member, shown as a coiled spring $E^8$. This prevents the thermostatic mechanism from forcing the valve $P'$ against the member $O^{14}$ with undue force. In this form of the apparatus the member $O^{14}$ is extended to a point adjacent the top of the chamber $O^2$ so that the quantity of liquid flowing out of the chamber $O^2$, when the chamber $O^2$ is connected to exhaust, is comparatively slight. It will be understood that the port $O^5$ of Fig. 6 is connected to the source of liquid pressure which ordinarily is the water supply system. The discharge port $O^{18}$ may be connected to a suitable discharge pipe leading, either to waste, or to some receptacle into which the water passing through the pilot valve mechanism is accumulated for use in any desired manner.

With the apparatus of Fig. 6, when the port $O^4$ is closed, the pressure in the chamber $O^2$ is approximately that of the atmosphere, and the valve F is held closed by the spring F and the gas pressure acting on the valve F. When the thermostatic mechanism operates to depress the valve stem P and open the port $O^4$ the pressure in the chamber $O^2$ immediately builds up. It will be understood that the amount of movement of the valve P is very slight, indeed, this movement may be no more than one or two thousandths of an inch or so, and in practice the valve closes the discharge passage from the chamber $O^2$ practically at the same instant the port $O^4$ is opened. When the pressure in the chamber $O^2$ builds up, the pressure acting on the exposed portion of the valve stem GB forces the latter outward and opens the valve F. The valve portion $G^{11}$ on the valve stem GB engages its seat and effectually prevents leakage at this time, when the pressure in the chamber $O^2$ is high. When the action of the thermostatic mechanism results in again moving the valve $P'$ to close the port $O^4$, the water escapes from the chamber $O^2$ in an amount sufficient to lower the water level down to the top of the member $O^{14}$.

The advantage of the threaded adjustment of the seat for the valve controlling the exhaust from the pilot valve casing may be obtained in the same structure in which a separate spring chamber is provided and leakage between said valve and its operating member is rendered immaterial. One arrangement for accomplishing this is shown in Fig. 8, where $K^{20}$ represents a casing part adapted to replace the member $K^8$, for instance, of Fig. 2. The member $K^2$ is formed with a central spring chamber which is surrounded by an annular channel and connected to the body of the member $K^{20}$ by ribs $K^{21}$. $K^{23}$ represents the locknut for locking the member $K^{20}$ in place against the pilot valve casing in the desired adjustment. $K^{24}$ represents the threaded opening into which the outlet or waste pipe for the pressure fluid passing through the pilot valve is connected.

The arrangement shown in Fig. 5, in which the pressure chamber shell is formed by two portions, one integrally connected to the main valve casing and the other integrally connected to the pilot valve casing, is simpler than that shown in Figs. 1 to 4 inclusive, and is preferable for that reason, under some conditions. In general, however, I prefer to make the pressure chamber detachable from the pilot valve casing in order to facilitate the connection of the thermostatic mechanism and pilot valve casing of the heater with which they are to be used.

While, in general, the various forms of apparatus disclosed can be used with any of the parts horizontal or vertical, or inclined to the horizontal, as desired, I usually prefer that the line of action of the main gas valve shall be horizontal when the pressure fluid controlled by the pilot valve mechanism is gas at the pressure of the ordinary gas supply system.

My use of the apparatus disclosed has demonstrated that with the forms in which gas from the supply mains is the pressure fluid controlled by the pilot valve, the opening and closing movements of the main gas valve are both rapid and positive, notwithstanding the comparatively small difference between the pressure of the atmosphere and the pressure in the gas supply system.

It will be obvious to those skilled in the art that the apparatus disclosed is compact and comparatively easy to manufacture and that the various parts may be assembled and taken apart, adjusted and repaired, with ease.

Various novel and important features of construction and arrangement disclosed but not claimed herein, are claimed in my copending application, Serial No. 709,355, filed July 15th, 1912.

While in accordance with the provisions of the statutes, I have illustrated and described the best forms of my invention now known to me, it will be apparent to those skilled in the art that changes may be made in the form of the apparatus disclosed without departing from the spirit of my invention, and that in some cases, certain features of the invention disclosed may be used with advantage without a corresponding use of other features.

Having now described my invention, what I claim as new and desire to secure by Letters Patent, is:

1. A thermostatic valve mechanism comprising in combination a main valve casing, a pilot valve casing and a pressure chamber open at one side to the interior of the main valve casing and at the other side to the interior of the pilot valve casing and formed of two casing parts detachably secured together and one rigidly secured to the main valve casing and the other rigidly but detachably secured to the pilot valve casing.

2. A thermostatic valve mechanism comprising in combination a main valve casing formed with a port, a valve controlling said port, a pilot valve casing, a pressure chamber open at one side to the interior of the main valve casing and at the other side to the interior of the pilot valve casing and formed of two parts detachably secured together and each detachably connected to the corresponding valve casing, and a flexible diaphragm dividing said chamber and secured at its margin between said chamber ports and operatively connected to said valve.

3. The combination of a main valve and fluid pressure operating means therefor including a compartment and thermostatically actuated mechanism controlling the admission to, and exhaust from said compartment of a pressure fluid for operating said valve in opposite directions, said mechanism including a valve casing formed with a chamber communicating with said compartment and having an inlet port opening to said chamber and a spring chamber opening away from said chamber and an outlet channel exterior to said spring chamber, a valve operating member having an extension projecting into said spring chamber, a spring located in said chamber and acting on said operating member and valve parts actuated by said member to open and close said port and passage.

4. The combination of a main valve and fluid pressure operating means therefor including a compartment and thermostatically actuated mechanism for controlling the admission to an exhaust from said compartment of a pressure fluid for operating said valve in opposite direction, said mechanism including a valve casing formed with a chamber communicating with said compartment, and with an inlet port opening to said chamber and a passage leading away from said chamber, a casing part removably secured in said passage and formed with a central spring chamber and an outlet channel exterior to said spring chamber, a valve operating member having a projection extending into said spring chamber, a spring located in said chamber and acting on said operating member, and ports actuated by said member to open and close said port and passage.

5. The combination of a main valve and fluid pressure operating means therefor including a compartment and thermostatically actuated mechanism for controlling the admission to and exhaust from said compartment of a pressure fluid for operating said valve in opposite directions, said mechanism including a valve casing formed with a chamber communicating with said compartment, and with an inlet port opening to said chamber and a threaded passage leading away from said chamber, a threaded casing part adjustably screwed into said passage and formed with a central spring chamber and an outlet channel exterior to said spring chamber, a pair of valves, one controlling said port and the other said channel, a valve operating member on which said valve members are slidingly mounted, said operating member having an extension projecting into said spring chamber and a spring located in said chamber and acting on said operating member.

6. The combination of a main valve and thermostatically controlled operating means therefor formed with a pressure chamber, the pressure in which controls the position of the main valve, an inlet port for admitting pressure fluid to said chamber, a spring chamber opening to said pressure chamber and an outlet channel external to said spring chamber through which the pressure fluid may escape from said pressure chamber, a thermostatically actuated pilot valve operating member having an extension projecting into said spring chamber, a spring located in said chamber acting on said operating member and valve parts actuated by said member to open and close said port and to open and close communication between said pressure chamber and said channel.

LUTHER D. LOVEKIN.

Witnesses:
ARNOLD KATZ,
J. R. BOUCOT.